US007126315B2

(12) United States Patent
Seo

(10) Patent No.: US 7,126,315 B2
(45) Date of Patent: Oct. 24, 2006

(54) DC/DC CONVERTER WITH INPUT AND OUTPUT CURRENT SENSING AND OVER CURRENT PROTECTION CAPABLE OF INTERRUPTING THE INPUT POWER SUPPLY

(75) Inventor: Kwang-youn Seo, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 154 days.

(21) Appl. No.: 10/732,819

(22) Filed: Dec. 11, 2003

(65) Prior Publication Data

US 2005/0001599 A1    Jan. 6, 2005

(30) Foreign Application Priority Data

Dec. 12, 2002    (KR)    ............. 10-2002-0079166

(51) Int. Cl.
H02H 9/00        (2006.01)
H02H 7/00        (2006.01)
H02J 1/10        (2006.01)

(52) U.S. Cl. .................. 323/272; 361/18; 363/65
(58) Field of Classification Search .......... 323/237, 323/272, 266, 267, 268; 361/18, 5, 87, 93.1; 363/65

See application file for complete search history.

(56) References Cited

U.S. PATENT DOCUMENTS

| 5,712,754 A * | 1/1998 | Sides et al. ............ 361/58 |
| 6,127,814 A * | 10/2000 | Goder ............... 323/282 |
| 6,218,816 B1 * | 4/2001 | Fritz et al. ............ 323/277 |
| 6,366,068 B1 | 4/2002 | Morishita |
| 6,385,024 B1 * | 5/2002 | Olson ............... 361/87 |
| 6,414,470 B1 * | 7/2002 | Liu et al. ............ 323/272 |

FOREIGN PATENT DOCUMENTS

| JP | 60-198613 | 10/1985 |
| JP | 11-220884 | 8/1999 |
| JP | 2000-14163 | 1/2000 |
| JP | 2000-78439 | 3/2000 |
| KR | 1994-25144 | 11/1994 |
| KR | 1997-13557 | 3/1997 |
| KR | 1998-57257 | 9/1998 |
| KR | 20-203131 | 9/2000 |
| KR | 2001-57241 | 7/2001 |

OTHER PUBLICATIONS

Triple Synchronous Buck Controller with NMOS LDO Controller; Texas Instruments Incorporated; 2002.
Enrico Dallago; Lossless Current Sensing in Low-Voltage High-Current DC/DC Modular Supplies; Member IEEE; 2000.

* cited by examiner

Primary Examiner—Karl Easthom
Assistant Examiner—Harry R Behm
(74) Attorney, Agent, or Firm—Staas & Halsey LLP

(57) ABSTRACT

A power supply system, includes a power supplying unit supplying a DC power; a DC/DC converter having a plurality of phase processing units separating the DC power supplied from the power supplying unit into a plurality of phase currents to process the plurality of phase currents, with which the DC/DC converter converts the DC power into individual power supplies in a plurality of different voltages; and a controller sensing phase currents of the phase processing units and controlling the power supplying unit so as to interrupt a power supply from the power supplying unit where a voltage corresponding to any one of the phase currents is higher than a predetermined reference voltage.

19 Claims, 4 Drawing Sheets

DC/DC CONVERTER WITH INPUT AND OUTPUT CURRENT SENSING AND OVER CURRENT PROTECTION CAPABLE OF INTERRUPTING THE INPUT POWER SUPPLY

CROSS-REFERENCE TO RELATED APPLICATION

This application claims the benefit of Korean Patent Application No. 2002-79166, filed Dec. 12, 2002, in the Korean Intellectual Property Office, the disclosure of which is incorporated herein by reference.

BACKGROUND OF THE INVENTION

1. Field of the Invention

The present invention relates, in general, to a power supply system and a method of controlling the same, and more particularly, to a power supply system having a power supplying unit supplying direct current (DC) power, and a DC/DC converter having a plurality of phase processing units with which the DC/DC converter converts the DC power supplied from the power supplying unit into a plurality of individual powers at different voltages, as needed for each component of a computer system, the plurality of phase processing units separating direct current supplied from the power supply system into a plurality of phase currents to process the plurality of phase currents.

2. Description of the Related Art

Generally, electronic or electric apparatuses require a DC power supplying unit to convert a commercial AC power into a DC voltage which is used to allow the electronic or electric apparatuses to operate. As the DC power supplying unit, a switching mode power supply (SMPS) system, being small in size, and being light in weight and having a high efficiency, has been mainly used.

In a conventional computer system, the DC power supplied from the power supply system is supplied to each component of the computer system installed within a motherboard thereof. Further, the DC power supplied from the power supply system is limited to DC voltages of, for example, 5V, 3.3V and 12V; for this reason, to adaptively generate voltage levels, as needed, for respective components provided within the motherboard such as a central processing unit (CPU), a chipset, a memory, etc., a DC/DC converter is provided within the motherboard. The DC/DC converter is supplied with a DC voltage applied from the power supply system and reduces the DC voltage from the power supply system to an appropriate level of the DC voltage.

As shown in FIG. 1, a DC/DC converter 120 is designed so as to meet wattage needed for each component. For example, in a case of a computer system employing a CPU of a Pentium-IV, the CPU needs a maximum power of about 90W (1.5V, 60A). Further, the computer system is supplied with a voltage level converted by the DC/DC converter 120 having a plurality of phase processing units 122, 124 and 126. Since a general DC/DC converter 120 is limited to a maximum current of 20 A, the DC/DC converter 120 having three phase processing units 122, 124 and 126 is used, wherein each phase processing unit 122, 124 and 126 is designed so that the maximum phase current flowing therein is 20 A. Further, the DC power is separated into three phases by the DC/DC converter 120 and adequate voltages thereof are supplied to the CPU as the loading unit 140 (see FIG. 1).

When at least one of the three phase processing units 122, 124 and 126 in the power supply system is damaged, a current distribution cannot be made equally. However, in a conventional power supply system, the computer system cannot immediately recognize such a trouble even where the current distribution is not uniform and the CPU has continuously operated. The continuous operation results in applying extra stress to other undamaged phase processing units, thereby causing trouble in an operation of the computer system.

SUMMARY OF THE INVENTION

Accordingly, it is an aspect of the present invention to provide a power supply system and a method of controlling the same, wherein, when a distribution of current flowing in each phase processing unit is not a uniform current, a computer system can be protected from damages by immediately recognizing the non-uniform current distribution.

Additional aspects and/or advantages of the invention will be set forth in part in the description which follows and, in part, will be obvious form the description, or may be learned by practice of the invention.

The above and/or other aspects are achieved by providing a power supply system, comprising a power supplying unit supplying a DC power; a DC/DC converter having a plurality of phase processing units separating the DC power supplied from the power supplying unit into a plurality of phase currents to process the plurality of phase currents, with which the DC/DC converter converts the DC power into individual powers in a plurality of different voltages needed for each component of a computer system; and a controller sensing phase currents of the phase processing units of the DC/DC converter and controlling the power supplying unit so as to interrupt the power supply from the power supplying unit where a voltage corresponding to any one of the phase currents is higher than a predetermined reference voltage.

According to an aspect of the present invention, the power supply system further comprises a reference voltage supplying unit supplying the reference voltage as the predetermined reference voltage.

According to an aspect of the present invention, the reference voltage supplying unit has an inductor disposed on a power line between the power supplying unit and one of the phase processing units, and an amplifier amplifying a voltage induced to first and second terminals of an inductor at a predetermined rate.

According to an aspect of the present invention, the power supply system further comprises a resistor connected between a source terminal and a drain terminal of an FET on a ground side thereof, provided in each of the phase processing units to sense respective phase currents of the phase processing units.

According to an aspect of the present invention, a reference voltage refers to a voltage corresponding to a maximum current as required by one of the phase processing units.

The above and/or other aspects may be achieved by providing a method of controlling a power supply system having a power supplying unit supplying a DC power, and a DC/DC converter having a plurality of phase processing units separating the DC power supplied from the power supplying unit into a plurality of phase currents to process the plurality of phase currents, with which the DC/DC converter converts the DC power into individual powers in a plurality of different voltages needed for each component of a computer system, comprising sensing respective phase currents of the phase processing units; comparing voltages corresponding to the sensed respective phase currents with a reference voltage; and controlling the power supplying unit so as to interrupt power supply from the power supplying unit where the voltage corresponding to any one of the phase currents is higher than the predetermined reference voltage, as a result of the comparison.

According to an aspect of the present invention, the method further comprises generating the reference voltage by amplifying voltage induced to first and second terminals of an inductor disposed on a power line between the power supplying unit and the phase processing units at a predetermined rate.

According to an aspect of the present invention, the reference voltage refers to a voltage corresponding to a maximum current as required by the phase processing units.

BRIEF DESCRIPTION OF THE DRAWINGS

These and/or other aspects and advantages of the present invention will become apparent and more readily appreciated from the following description of the embodiments, taken in conjunction with the accompany drawings of which.

DETAILED DESCRIPTION OF THE PREFERRED EMBODIMENT

Figure 1:
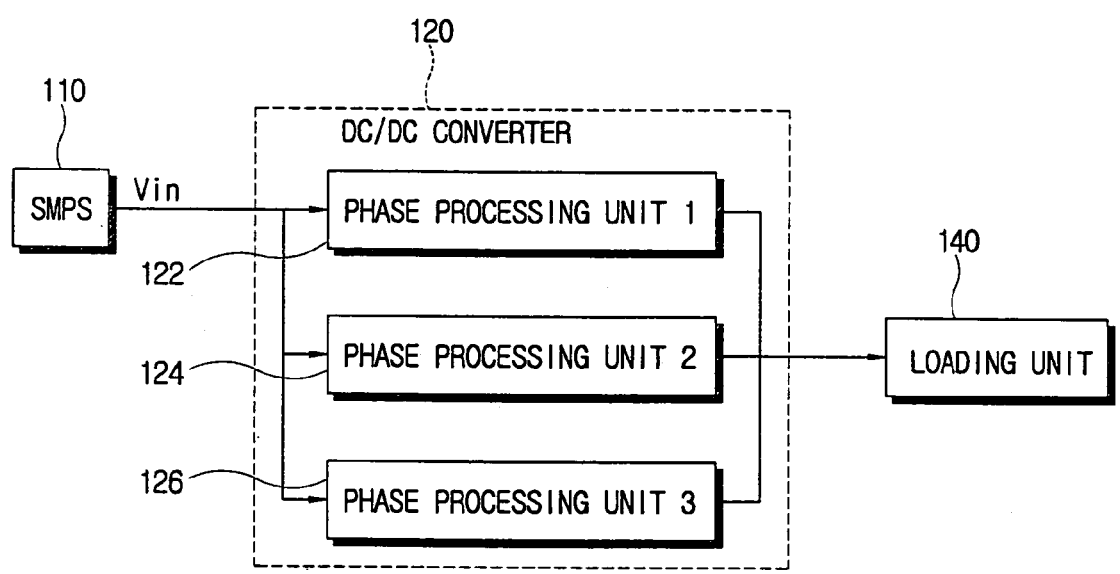
FIG. 1 is a block diagram showing a configuration of a conventional power supply system.

Reference will now be made in detail to the embodiment of the present invention, examples of which are illustrated in the accompanying drawings, wherein like reference numerals refer to like elements throughout. The embodiment is described below in order to explain the present invention by referring to the figures.

Figure 2:
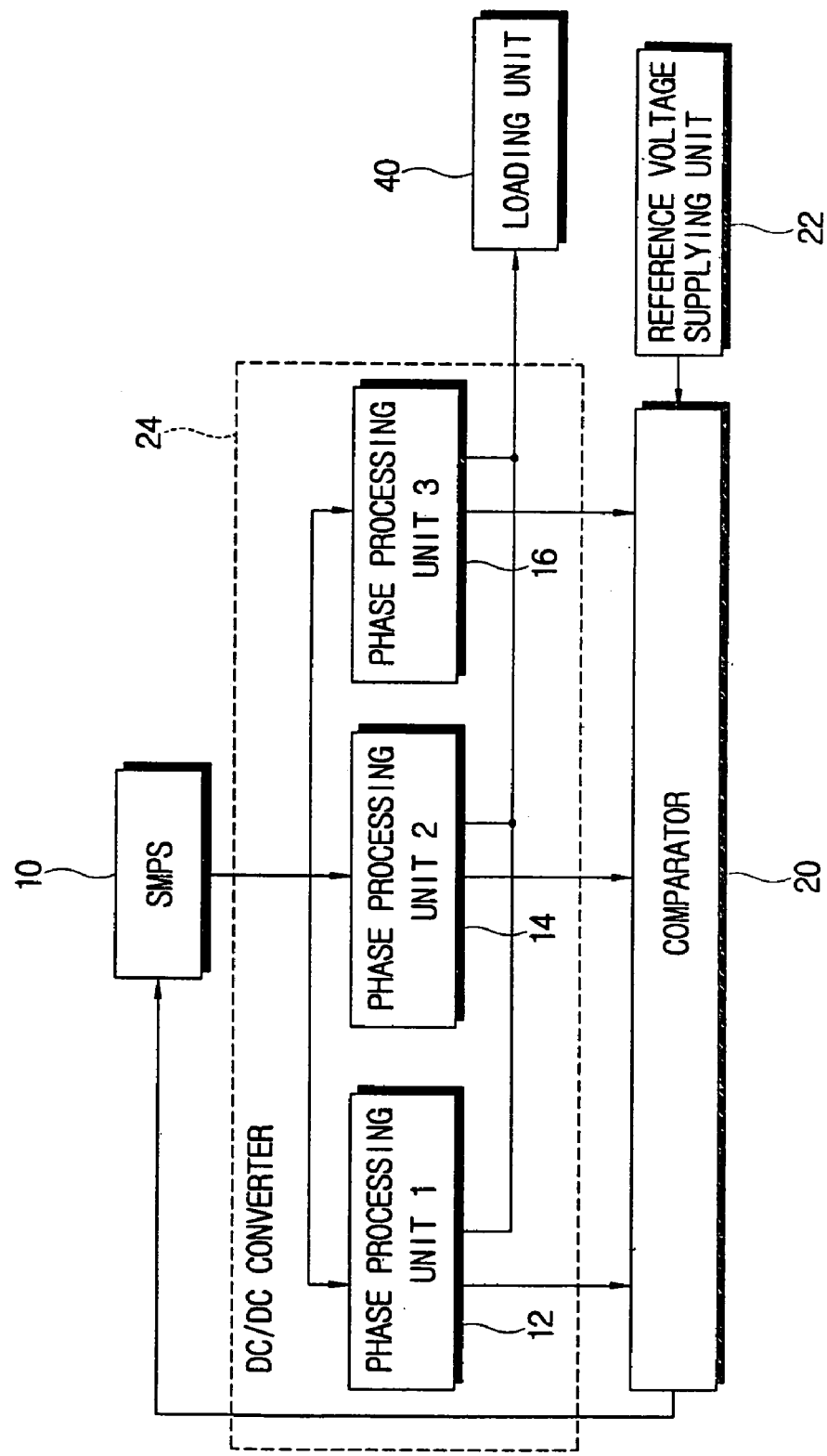
FIG. 2 is a block diagram showing a configuration of a power supply system according to an embodiment of the present invention.

FIG. 2 is a block diagram showing a configuration of a power supply system according to an embodiment of the present invention. As shown in FIG. 2, the power supply system comprises an SMPS 10 as a power supplying unit, and a DC/DC converter 24 converting DC power supplied from the SMPS 10 into a plurality of voltage levels, as needed, for each component of a computer system.

The SMPS 10 rectifies a commercial AC power inputted from an outside into the DC power and transforms the rectified DC power so as to have a voltage of a predetermined level and then outputs the voltage having the predetermined level.

The DC/DC converter 24 operates to receive and to reduce an applied DC voltage output from the SMPS 10 so as to supply the voltage of the predetermined level to a loading unit 40, and includes a plurality of phase processing units 12, 14 and 16 to provide a maximum wattage, as needed, for each component (e. g., a CPU, a chipset, a memory, etc.) of the computer system requiring a high-level of power. The present embodiment employs a DC/DC converter 24 having three phase processing units 12, 14 and 16 but more or less phase processing units are possible.

The DC power supplied from the SMPS 10 is supplied to the respective phase processing units 12, 14 and 16, and a voltage of the power supplied to each of the phase processing units 12, 14 and 16 is reduced by a switching process of each of the phase processing units 12, 14 and 16 in response to a waveform of a pulse width modulation (PWM) generated in a PWM controller 26 (see FIG. 3) connected to each of the phase processing units 12, 14 and 16. At this time, a turn-on/turn-off period of a switching element provided within each of the phase processing units 12, 14 and 16 is controlled by the PWM controller 26.

The power supply system includes a comparator 20 comparing the voltage corresponding to a phase current flowing in each of the phase processing units 12, 14 and 16 with a predetermined reference voltage, and a reference voltage supplying unit 22 supplying the predetermined reference voltage to the comparator 20.

The comparator 20 compares voltages corresponding to respective phase currents with the predetermined reference voltage and outputs a control signal so as to allow the power from the SMPS 10 to be interrupted where a voltage corresponding to a respective phase current is higher than the predetermined reference voltage. Further, the predetermined reference voltage of the comparator 20 has to be established, which will serve as an indicator to assert whether a distribution of each of the phase currents is uniform.

Figure 3:
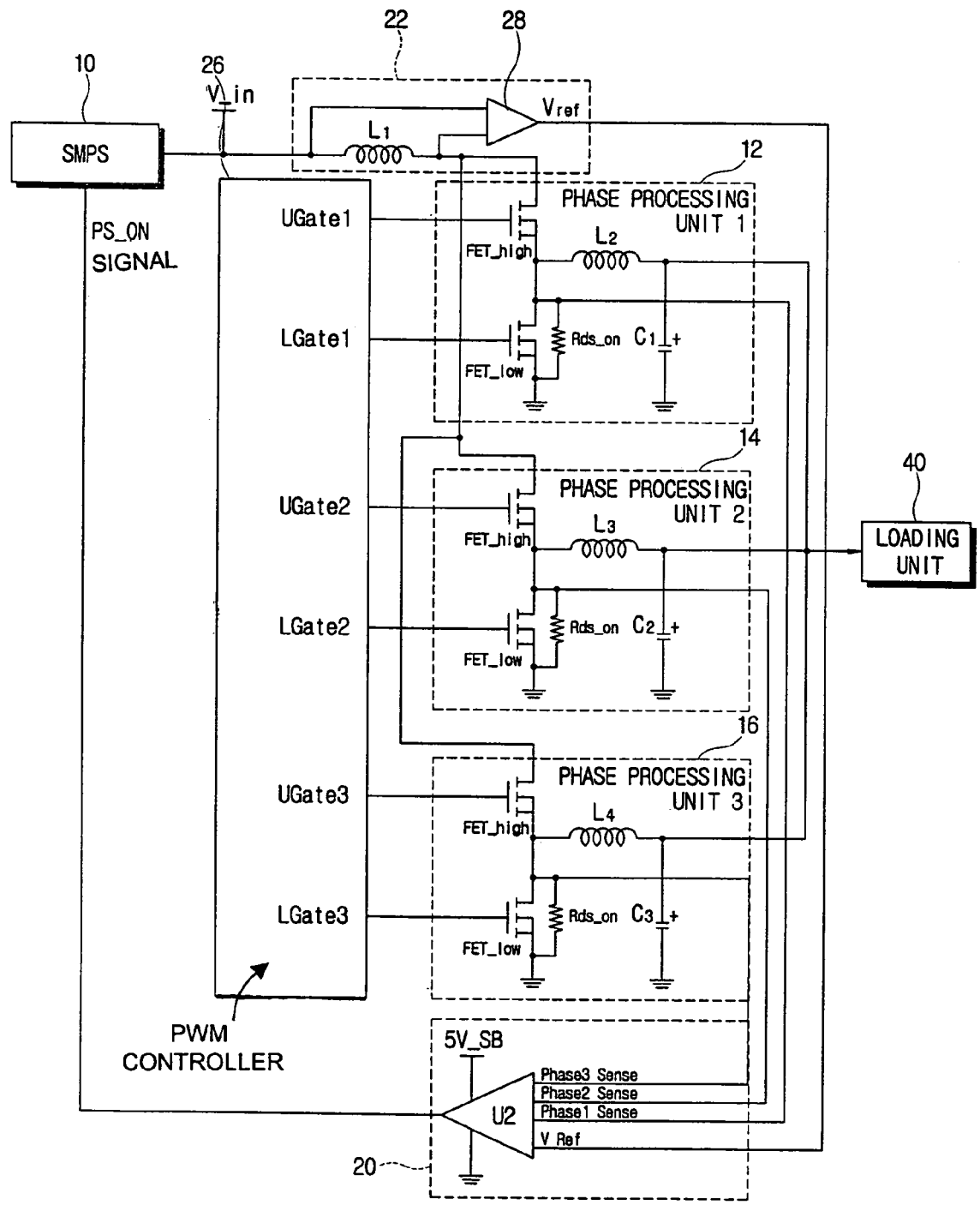
FIG. 3 is a detailed circuit diagram of FIG. 2.

The power supply system according to the embodiment of the present invention will be described in detail, with reference to the circuit diagram illustrated in FIG. 3.

The DC/DC converter 24 has a plurality of phase processing units 12, 14 and 16 with which the power supplied from the SMPS 10 is separated into a plurality of phase currents so as to process the plurality of phase currents. Each of the phase processing units 12, 14 and 16 comprises an FET (Field Effect Transistor) as a switching element, an inductor ( $L_2$, $L_3$ or $L_4$), and a capacitor ($C_1$, $C_2$ or $C_3$), respectively. A PWM controller 26 to control a turn on/turn off of the FET (FET_high, FET_low) is provided in the DC/DC converter. The PWM controller 26 outputs a predetermined pulse width modulation signal to each of the FETs (FET_high, FET_low) to initiate a switching process of the FETs (FET_high, FET_low). By the FET's switching process (FET_high, FET_low), a predetermined voltage is output to the loading unit 40.

Between respective first and second terminals of each of the capacitors $C_1$, $C_2$ and $C_3$, voltages are provided by discharging the respective capacitor $C_1$, $C_2$, and $C_3$ through respective inductors $L_2$, $L_3$ and $L_4$, connected to the FETs (FET_high, FET_low). The voltages between first and second terminals of each of the capacitors $C_1$, $C_2$, and $C_3$ induce a voltage to a common node connecting the terminals of respective sets of FETs (FET_high, FET_low). Thus for each set of FETs, as the FET_high is turned off and the FET_low is turned on by the PWM controller 26 the induced voltages across the terminals of each of the FET_lows indicate an amount of current flowing in respective phase processing units 12, 14 and 16. The induced voltage is sensed as a voltage across a resistance value (Rds_on) of the resistor connected between a source terminal and a drain terminal of the FET_low as the FET_low turns on. Accordingly, the phase current of each of the phase processing units 12, 14 and 16 is output to the comparator 20.

Each of the sensed phase currents, sensed by the resistance value (Rds_on) as a voltage is applied to a non-inverting input terminal (+) of the comparator 20, thereby causing a potential difference to be generated, and the voltage is compared with the reference voltage applied to an inverting terminal (−) of the comparator 20. Further, the reference voltage is defined as the voltage output by allowing the voltage inducted to first and second terminals of the inductor L1 disposed on a power line between the SMPS 10 and the phase processing units 12, 14 and 16 to be output through an amplifier 28. This is available because of a design based on the current flowing toward the phase processing units 12, 14 and 16 from a power source. That is, the SMPS 10 can reduce an error since the DC/DC converter 24 has a plurality of phase processing units 12, 14 and 16, distributes the current flowing from the SMPS 10 into a plurality of phases and supplies the plurality of phase currents to the loading unit 40. An amplification rate by the amplifier 28 is established so that the reference voltage approximately coincides with the voltage value corresponding to a maximum current as required by each of the phase processing units 12, 14 and 16.

The comparator 20 compares a voltage corresponding to each of the phase currents with the reference voltage. If the voltage of a phase current is higher than the reference voltage, the comparator 20 outputs a high level signal. If the voltage of a phase current is lower than the reference voltage, the comparator 20 outputs a low level signal. The output signal is applied to the SMPS 10 as a PS-ON signal. That is, since an output line of the comparator 20 is connected to a PS-ON pin to which the PS-ON signal is applied, among pins of a connector connecting the SMPS 10 and a motherboard, the output signal of the comparator is applied as the PS_ON signal.

The PS_ON signal is output from a condition sensing circuit provided in the motherboard and supplied to the SMPS 10 when a power switch of a computer system is turned on, to thereby allow the SMPS 10 to supply the power to each component installed in the motherboard. Generally, the power is supplied when the output of the comparator 20 is the low level signal which is applied to the SMPS 10.

If the high level signal is output as an output signal of the comparator 20, serving as a PS_ON signal, an output power of the SMPS is interrupted. If the low level signal is output, as an output signal of the comparator 20, the power supply is normally performed.

A principle of establishing the reference voltage and an operating process of the comparator 20 will be described. In a case of an FET which is generally used, a resistance value (Rds-on) of the FET is about 10 mΩ when the computer system is turned on, and the potential difference of 20 mV is generated across first and second terminals of the FET (FET_low) where the maximum phase current is 20 A. This is established as the reference voltage. That is, the voltage when the potential difference generated across the first and second terminals of the inductor $L_1$ provided between the SMPS 10 and the phase processing units 12, 14 and 16 and output by the amplifier 28 is 20 mV.

Where the three phase processing units 12, 14 and 16 are all normally operated, the current from the SMPS 10 is, respectively, distributed by about 33% to each of the phase processing units 12, 14 and 16 and the distributed currents are supplied to the loading unit 40, and thus, the voltages corresponding to each of the respective phase currents are uniform below 20 mV. However, where any one of the phase processing units 12, 14 and 16 is not normally operated, the other two phase processing units respectively distribute the current from the SMPs 10 by 50% rather than by 33% to each of the other two phase processing units 12, 14 and 16 and supply the distributed currents to the loading unit 40. Accordingly, the voltages corresponding to the remaining phase currents are over 20 mV. In this case, the comparator 20 outputs the high level signal to interrupt the power supply to the loading unit 40.

With regard to a problem in distribution of phase currents, where any one of the phase currents flows excessively, the power supply can directly sense the excessive flows and interrupt the power supply, thereby being able to safely protect the system from damages.

Figure 4:
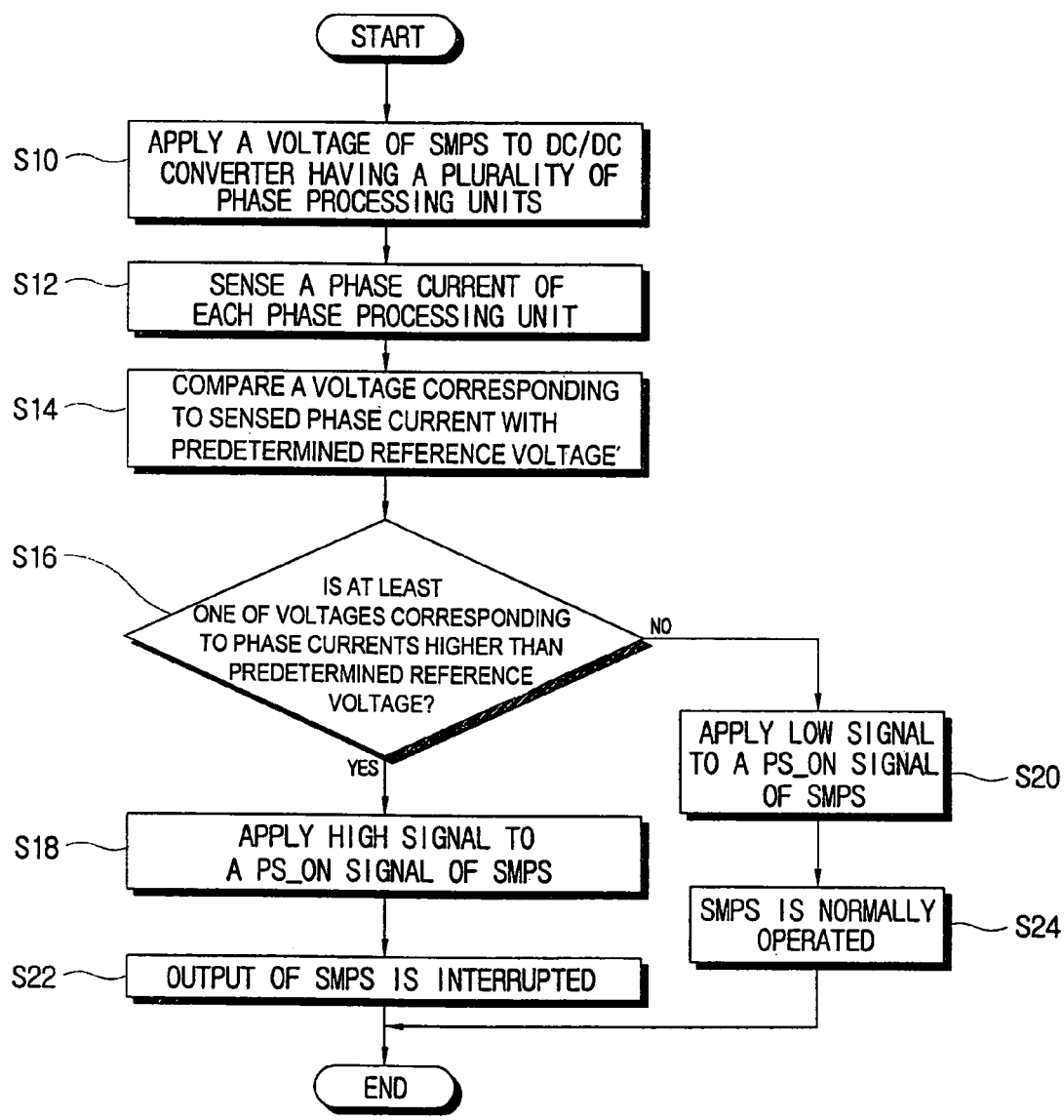
FIG. 4 is a flow chart showing a method of controlling the power supply system according to the embodiment of the present invention.

The method of controlling the power supply system according to the embodiment of the present invention is shown in FIG. 4. As shown in FIG. 4, a power of the SMPS 10 is supplied to a DC/DC converter 24 having a plurality of phase processing units 12, 14 and 16 at operation S10. A phase current is sensed as the FET_Low of each of the phase processing units 12, 14 and 16 is turned on at operation S12, and a potential difference is generated when a voltage corresponding to the sensed phase current is applied to an input terminal of the comparator 20. The voltage corresponding to the sensed phase current is compared with the predetermined reference voltage supplied from a reference voltage supplying unit 22 at operation S14. Where the voltage of the phase current is higher than the predetermined reference voltage, as a result of the comparison at operation S16, the high level signal is output at operation S18. Where the voltage of the phase current is lower than the predetermined reference voltage, the low level signal is output at operation S20. The signal of the high and/or the low level is applied as a PS_ON signal of the SMPS 10. When the high level signal is applied, the power supply of the SMPS 10 is interrupted at operation S22. Further, when the low level signal is applied, the SMPS 10 normally operates to supply the power at operation S24. When any one of the phase currents flows excessively because the current distribution is not uniform, the trouble is sensed immediately, thereby preventing damage to the computer system.

In the embodiment of the present invention, the comparator 20 and the reference voltage supplying unit 22 are provided separately from the DC/DC converter 24, but the comparator 20 and the reference voltage supplying unit 22 may be provided within the DC/DC converter 24.

In the embodiment of the present invention, the output signal of the comparator 20 is supplied to the SMPS 10 to interrupt the power supply. However, by connecting a switching unit to an output terminal of the SMPS 10, the switching unit is controllable according to a control signal to interrupt the power supply. Further, the switching unit may be an electronic switch operating responsively to the control signal to interrupt the power supply.

In the embodiment of the present invention, the output signal of the comparator 20 is supplied to the SMPS 10 to interrupt the power supply from the SMPS 10. However, an interruption of the power supply is realizable by a microcomputer programmed so as to control the SMPS 10 where the voltage corresponding to a phase current is higher than the predetermined reference voltage after comparing the voltage generated based on the phase current flowing in each of the phase processing units 12, 14 and 16 with the predetermined reference voltage.

In the embodiment of the present invention, the DC/DC converter 24 having the three phase processing units 12, 14 and 16 has been described as an example. However, the present invention can employ any type of DC/DC converter that has a plurality of phase processing units, regardless of a number of the phase processing units.

The present invention can serve to prevent damage to components of a computer system due to abnormal distribution of phase currents, by sensing the amount of each of the phase currents flowing in the DC/DC converter having a plurality of phase processing units.

A power supply system and a method of controlling the same is provided, wherein a computer system can be prevented from damage by immediately sensing unequal distribution of currents flowing in each of the phase processing units.

Although an embodiment of the present invention have been shown and described, it will be appreciated by those skilled in the art that changes may be made in the embodiment without departing from the principles and spirit of the invention, the scope of which is defined in the appended claims and their equivalents.

What is claimed is:

1. A power supply system, comprising:
   a power supplying unit supplying DC power;
   a DC/DC converter having a plurality of phase processing units separating the DC power supplied from the power supplying unit into a plurality of phase currents to process the plurality of phase currents, with which the DC/DC converter converts the DC power into individual power supplies in a plurality of different voltages needed for each component of a computer system; and
   a controller sensing the phase currents of each of the phase processing units of the DC/DC converter and controlling the power supplying unit so as to interrupt the DC power supply from the power supplying unit where a voltage corresponding to any one of the phase currents is higher than a predetermined reference voltage.

2. The power supply system according to claim 1, further comprising:
   a reference voltage supplying unit supplying the predetermined reference voltage.

3. The power supply system according to claim 2, wherein the reference voltage supplying unit comprises:
   an inductor disposed on a power line between the power supplying unit and the phase processing units; and
   an amplifier amplifying a voltage induced across first and second terminals of the inductor at a predetermined rate.

4. The power supply system according to claim 3, further comprising:
   a resistor and an FET, so as to comprise a unit in which the resistor is connected between a source terminal and a drain terminal of the FET on a ground side thereof, the unit being provided in each of the phase processing units, wherein the resistor is used to sense the voltage corresponding to the phase current of the respective phase processing units.

5. The power supply system according to claim 1, wherein the predetermined reference voltage corresponds to a maximum coincident current of the phase processing units.

6. The power supply system according to claim 2, wherein the predetermined reference voltage corresponds to a maximum coincident current of the phase processing units.

7. The power supply system according to claim 3, wherein the predetermined reference voltage corresponds to a maximum coincident current of the phase processing units.

8. The power supply system according to claim 4, wherein the predetermined reference voltage corresponds to a maximum coincident current of the phase processing units.

9. A method of controlling a power supply system having a power supplying unit supplying a DC power, and a DC/DC converter having a plurality of phase processing units separating the DC power supplied from the power supplying unit into a plurality of phase currents to process the plurality of phase currents, with which the DC/DC converter converts the DC power into individual power supplies in a plurality of different voltages needed for each component of a computer system, comprising:
   sensing the phase current of each of the phase processing units;
   comparing a voltage corresponding to the sensed phase current of each of the phase processing units with a reference voltage; and
   controlling the power supplying unit so as to interrupt a power supply from the power supplying unit where the voltage corresponding to any one of the phase currents is higher than the predetermined reference voltage, as a result of the comparing.

10. The method according to claim 9, further comprising:
    generating the predetermined reference voltage by amplifying a voltage induced across first and second terminals of an inductor disposed on a power line between the power supplying unit and the phase processing units at a predetermined rate.

11. The method according to claim 9, wherein the predetermined reference voltage corresponds to a maximum coincident current of the phase processing units.

12. The method according to claim 10, wherein the predetermined reference voltage corresponds to a maximum coincident current of the phase processing units.

13. A power supply system having a DC power supply therein, comprising:
    a DC/DC converter being supplied with DC power by the DC power supply and comprising:
    a plurality of phase processing units to supply, respectively, a plurality of phase currents such that the plurality of phase processing units convert the DC power into a plurality of different voltages; and
    a controller sensing a voltage corresponding to the phase currents of each of the phase processing units and interrupting the DC power supply when the sensed voltage corresponding to any one of the phase currents is higher than a predetermined reference voltage.

14. The power supply system according to claim 13, further comprising:
    a reference voltage supplying unit supplying the predetermined reference voltage.

15. The power supply system according to claim 14, wherein the reference voltage supplying unit comprises:
    an inductor disposed on a power line between the power supplying unit and the phase processing units; and
    an amplifier amplifying a voltage induced across first and second terminals of the inductor at a predetermined rate.

16. The power supply system according to claim 13, wherein each of the phase processing units comprises:
    a resistor and a transistor, so as to comprise a unit in which the resistor is connected between a source terminal and a drain terminal of the transistor and senses the voltage corresponding to the phase current of respective ones of the phase processing units.

17. The power supply system according to claim 14, wherein the predetermined reference voltage corresponds to maximum coincident current of the phase processing units.

18. The power supply system according to claim 17, wherein the maximum coincident current of the phase processing units is a sum of the maximum phase currents from each of the phase processing units.

19. The power supply system according to claim 13, wherein:
  the controller comprises:
    a pulse width modulation controller generating a pulse width modulation signal; and
  each of the phase processing units comprise: switching elements such that a turn-on/turn-off period of the switching elements are controlled by the pulse width modulation controller to reduce the voltage supplied by each of the phase processing units.

* * * * *